No. 827,392. PATENTED JULY 31, 1906
C. PRANGEMEIER.
IMPLEMENT FOR DRIVING IN NAILS.
APPLICATION FILED NOV. 16, 1903.

Witnesses
Inventor
Caspar Prangemeier.

UNITED STATES PATENT OFFICE.

CASPAR PRANGEMEIER, OF MÜNSTER, GERMANY.

IMPLEMENT FOR DRIVING IN NAILS.

No. 827,392.  Specification of Letters Patent.  Patented July 31, 1906.

Application filed November 16, 1903. Serial No. 181,461.

*To all whom it may concern:*

Be it known that I, CASPAR PRANGEMEIER, a subject of the King of Prussia, German Emperor, and a resident of No. 41/42 Katthagen, in the city of Münster, in the Empire of Germany, have invented a new and useful Implement for Driving in Nails, of which the following is a specification.

My invention relates to improvements in implements for driving in nails which obviate the necessity of holding the nails by the fingers.

Special objects of my invention are to simplify and cheapen the construction and to render more efficient, serviceable, and durable in operation devices of the kind referred to.

With these ends in view the invention consists in the novel combination, arrangement, and adaptation of parts, all as more fully hereinafter explained, shown in the accompanying drawings, and then specifically set out in the appended claim.

The drawings show an example of carrying the invention into practice.

Figure 1:
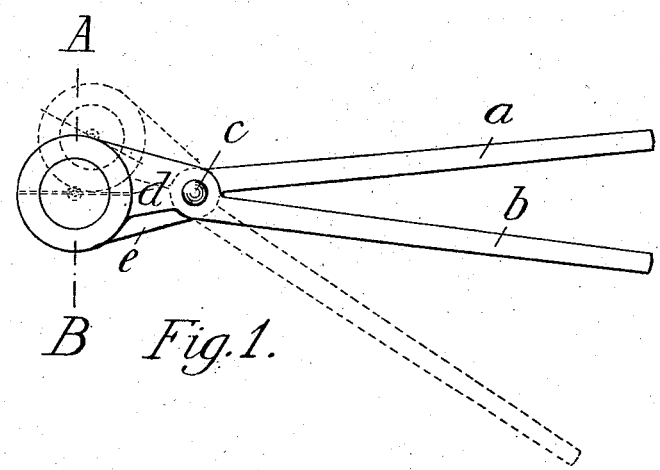
Figure 2:
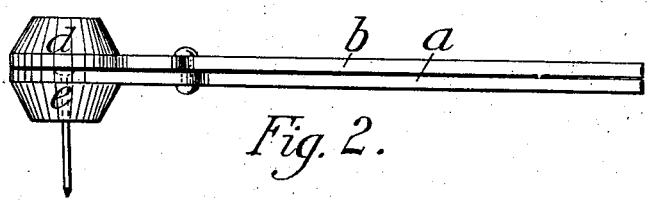
Figure 3:
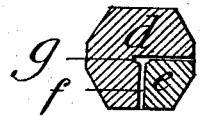

Figure 1 represents a plan view of the implement. Fig. 2 is a side elevation of Fig. 1, and Fig. 3 shows a section on line A B of Fig. 1.

The hitherto customary method of driving in nails frequently leads to injuries of the fingers by improper blows of the hammer. To obviate this drawback, implements in the shape of tongs or pliers have become known. The present invention relates to improvements in such implements and specially aims at protecting the head of the nails against deformation through hammer-blows.

The two shanks $a$ $b$ of the implement are rotatable around the pivot $c$. At the front ends of the shanks cheeks $d$ $e$ are provided in the usual manner. The upper cheek $d$ is adapted to cover the cheek $e$ when the implement is in its closed position. The vertical abutment-faces of the two cheeks $d$ $e$ show oppositely-situated vertical grooves $f$, which make up a circular bore. The upper ends of the grooves $f$ are laterally extended, as shown at $g$, to accommodate the head of the nail.

To use the implement hereinbefore described, the shanks $a$ $b$ are opened, thereby separating the two cheeks $d$ $e$. The nail to be driven in is placed in the groove $f$ in the cheek $d$ with its head resting in the extension $g$, and the two shanks are brought close together and the cheeks $d$ $e$ are tightly pressed upon one another, holding the nail between them. After placing the point of the nail at the required place, while holding the implement with one hand, the blows of the hammer are directed upon the upper surface of the upper cheek $d$. The nail being securely held in the bore $f$ is prevented from bending, while the head of same is protected against deformations through being covered by the upper portion of the cheek $d$. Nails with fancy or decorative heads are largely used by upholsterers, saddlers, and for other purposes. The rest portion of the nail which is embedded in the cheeks $d$ $e$ is driven in after the removal of the implement in the customary manner.

Owing to the fact that by means of the present invention the blows of the hammer are directed on a comparatively large surface in contradistinction to the small surface which the head of the nail offers, besides protecting the head of the nail, as hereinbefore mentioned, the wall or like surface into which the nail is driven is protected against injuries by improper blows.

Obviously the length of the bore $f$ and the dimensions of the various parts of the implement are chosen to suit the requirements. I wish it to be understood that I do not restrict myself to the exact construction of the individual parts as shown in the drawings, but that I may carry out modifications within the scope of my invention.

I am aware that previous to my application devices have become known which facilitate the driving in of nails, and in consequence I do not claim such a device *per se*, but the peculiar combination of component parts, as hereinbefore in detail described.

What I do claim as my invention, and desire to secure by Letters Patent, is—

An implement for driving in nails, comprising, in combination, a pair of shanks $a$, $b$; a pivot $c$ rotatably connecting the shanks; cheeks $d$, $e$ at the front ends of the shanks; said cheeks provided in their vertical abutment-faces with oppositely-situated vertical grooves $f$ for the reception of the nail, and with a wider bore $g$ at the upper ends of the grooves $f$ for the accommodation of the nail-head; and a lateral projection at the top end of the vertical abutment-face of the cheek $d$ adapted to cover up the cheek $e$, substantially as described and shown and for the purpose set forth.

In testimony whereof I have signed my name to this specification in the presence of two subscribing witnesses.

CASPAR PRANGEMEIER.

Witnesses:
WILLIAM ESSENWEIN,
PETER LIEBER.